United States Patent
Pawlukowsky et al.

(10) Patent No.: US 11,477,128 B1
(45) Date of Patent: Oct. 18, 2022

(54) BANDWIDTH THROTTLING IN VULNERABILITY SCANNING APPLICATIONS

(71) Applicant: Tripwire, Inc., Portland, OR (US)

(72) Inventors: Chris Pawlukowsky, Alpharetta, GA (US); Ian Turner, Atlanta, GA (US); Mike Appleby, Guadalajara (MX)

(73) Assignee: Tripwire, Inc., Portland, OR (US)

( * ) Notice: Subject to any disclaimer, the term of this patent is extended or adjusted under 35 U.S.C. 154(b) by 0 days.

(21) Appl. No.: 16/846,197

(22) Filed: Apr. 10, 2020

Related U.S. Application Data

(62) Division of application No. 15/709,245, filed on Sep. 19, 2017, now Pat. No. 10,623,325, which is a
(Continued)

(51) Int. Cl.
| | | |
|---|---|---|
| *H04L 47/2491* | (2022.01) | |
| *H04L 9/40* | (2022.01) | |
| *H04L 47/2408* | (2022.01) | |
| *H04L 47/22* | (2022.01) | |
| *H04L 47/10* | (2022.01) | |

(Continued)

(52) U.S. Cl.
CPC ......... *H04L 47/2491* (2013.01); *H04L 47/22* (2013.01); *H04L 47/2408* (2013.01); *H04L 63/0227* (2013.01); *H04L 63/0245* (2013.01); *H04L 63/1433* (2013.01);
(Continued)

(58) Field of Classification Search
CPC ............. H04L 47/2491; H04L 63/1433; H04L 47/2408; H04L 63/0245; H04L 47/22; H04L 63/0227; H04L 67/322; H04L 47/20; H04L 47/10
See application file for complete search history.

(56) References Cited

U.S. PATENT DOCUMENTS

| | | |
|---|---|---|
| 6,502,135 B1 | 12/2002 | Munger |
| 6,574,737 B1 | 6/2003 | Kingsford |

(Continued)

OTHER PUBLICATIONS

Pfeifer, H. "IPv6 Fragment Header Deprecated draft-bonica-6man-frag-deprecate-02." (2013). https://datatracker.ietf.org/meeting/87/agenda/tsvwg-drafts.pdf.*
(Continued)

*Primary Examiner* — Jimmy H Tran
(74) *Attorney, Agent, or Firm* — Fredrikson & Byron, P.A.

(57) ABSTRACT

Apparatus and methods are disclosed for implementing bandwidth throttling to regulate network traffic as can be used in, for example, vulnerability scanning and detection applications in a computer network environment. According to one embodiment, a method of routing network packets in a networked device having plural network interfaces combines applying traffic class and network interface throttling for marking network packets with a differentiated service code based on input received from a profiler application, throttling the bandwidth of network packets based on a threshold for a designated network interface for the packet, throttling the bandwidth of the bandwidth-throttled packets based on a threshold for its respective differentiated service code, and emitting network packets on each respective designated network interface.

18 Claims, 4 Drawing Sheets

Related U.S. Application Data division of application No. 14/546,863, filed on Nov. 18, 2014, now Pat. No. 9,781,046.

(60) Provisional application No. 61/906,322, filed on Nov. 19, 2013.

(51) Int. Cl.
  *H04L 47/20* (2022.01)
  *H04L 67/61* (2022.01)

(52) U.S. Cl.
  CPC .............. *H04L 47/10* (2013.01); *H04L 47/20* (2013.01); *H04L 67/61* (2022.05)

(56) References Cited

U.S. PATENT DOCUMENTS

| | | |
|---|---|---|
| 6,957,348 B1 | 10/2005 | Flowers et al. |
| 7,073,198 B1 | 7/2006 | Flowers et al. |
| 7,162,742 B1 | 1/2007 | Flowers et al. |
| 7,181,769 B1 | 2/2007 | Keanini et al. |
| 7,243,348 B2 | 7/2007 | Good et al. |
| 7,316,016 B2 | 1/2008 | DiFalco |
| 7,360,099 B2 | 4/2008 | DiFalco et al. |
| 7,451,488 B2 | 11/2008 | Cooper |
| 7,509,681 B2 | 3/2009 | Flowers et al. |
| 7,587,754 B2 | 9/2009 | DiFalco et al. |
| 7,594,273 B2 | 9/2009 | Keanini et al. |
| 7,620,715 B2 | 11/2009 | DiFalco et al. |
| 7,765,460 B2 | 7/2010 | DiFalco et al. |
| 7,822,724 B2 | 10/2010 | DiFalco et al. |
| 8,020,211 B2 | 9/2011 | Keanini et al. |
| 8,117,657 B1* | 2/2012 | Elrod ................ H04L 63/0236 713/153 |
| 8,140,635 B2 | 3/2012 | DiFalco |
| 8,176,158 B2 | 5/2012 | DiFalco et al. |
| 8,176,544 B2 | 5/2012 | Keanini et al. |
| 8,230,071 B1 | 7/2012 | Quilter et al. |
| 8,339,959 B1 | 12/2012 | Moisand et al. |
| 8,356,089 B1 | 1/2013 | Quilter et al. |
| 8,615,572 B1 | 12/2013 | Quilter et al. |
| 8,891,588 B1* | 11/2014 | Hui ...................... H04L 45/306 375/133 |
| 9,118,715 B2* | 8/2015 | Staniford ............ H04L 63/1491 |
| 9,179,359 B2* | 11/2015 | Raleigh ............... H04L 41/5054 |
| 9,191,400 B1* | 11/2015 | Ptasinski ............. H04L 67/322 |
| 9,781,046 B1 | 10/2017 | Pawlukowsky et al. |
| 9,900,337 B2 | 2/2018 | Gorny |
| 10,158,660 B1 | 12/2018 | Reguly et al. |
| 10,623,325 B1 | 4/2020 | Pawlukowsky et al. |
| 2002/0018456 A1 | 2/2002 | Kakemizu et al. |
| 2002/0143981 A1* | 10/2002 | DeLima ................. H04L 67/02 709/233 |
| 2002/0145981 A1* | 10/2002 | Klinker ................. H04L 41/083 370/244 |
| 2002/0191622 A1* | 12/2002 | Zdan .................... H04L 45/308 370/401 |
| 2002/0196330 A1 | 12/2002 | Park et al. |
| 2003/0007453 A1* | 1/2003 | Ogier ...................... H04L 47/17 370/229 |
| 2003/0217039 A1 | 11/2003 | Kurt |
| 2004/0024843 A1 | 2/2004 | Smith |
| 2004/0075738 A1 | 4/2004 | Burke et al. |
| 2004/0122962 A1 | 6/2004 | DiFalco et al. |
| 2005/0005171 A1 | 1/2005 | Oliphant |
| 2005/0086339 A1 | 4/2005 | Krishnan |
| 2005/0114541 A1* | 5/2005 | Ghetie ................ H04L 47/2425 709/232 |
| 2005/0276228 A1* | 12/2005 | Yavatkar ............ H04L 63/0227 370/242 |
| 2006/0095970 A1 | 5/2006 | Rajagopal |
| 2006/0126504 A1 | 6/2006 | Meier et al. |
| 2006/0137009 A1* | 6/2006 | Chesla ................. G06F 21/552 726/22 |
| 2006/0206883 A1 | 9/2006 | Sabbouh |
| 2006/0239188 A1* | 10/2006 | Weiss .................. H04L 47/2433 370/229 |
| 2006/0242277 A1 | 10/2006 | Torrence et al. |
| 2007/0043786 A1 | 2/2007 | DiFalco et al. |
| 2007/0124255 A1 | 5/2007 | DiFalco et al. |
| 2007/0157316 A1* | 7/2007 | Devereux ........... H04L 63/0227 726/24 |
| 2007/0199064 A1 | 8/2007 | Pueblas |
| 2007/0239862 A1 | 10/2007 | Bronez et al. |
| 2007/0274314 A1* | 11/2007 | Werber .............. H04L 41/5022 370/392 |
| 2007/0283007 A1 | 12/2007 | Keir |
| 2008/0016501 A1 | 1/2008 | Muhlestein et al. |
| 2008/0021912 A1 | 1/2008 | Seligman et al. |
| 2008/0168420 A1 | 7/2008 | Sabbouh |
| 2008/0244747 A1* | 10/2008 | Gleichauf ........... H04L 63/1433 726/25 |
| 2008/0320548 A1* | 12/2008 | Tripathi ................ G06F 21/552 714/E11.01 |
| 2009/0013404 A1* | 1/2009 | Chow ................. H04L 63/1458 726/22 |
| 2009/0031423 A1* | 1/2009 | Liu ......................... H04L 63/10 726/23 |
| 2009/0113517 A1* | 4/2009 | Engdahl .............. H04L 63/0254 726/1 |
| 2009/0182874 A1 | 7/2009 | Morford et al. |
| 2010/0005107 A1 | 1/2010 | DiFalco |
| 2010/0043066 A1 | 2/2010 | Miliefsky |
| 2010/0131668 A1* | 5/2010 | Kamath .................. H04L 47/32 709/233 |
| 2010/0188993 A1* | 7/2010 | Raleigh .............. G06Q 30/0283 370/252 |
| 2010/0208591 A1* | 8/2010 | Corliano ................ H04L 47/31 370/237 |
| 2010/0251329 A1* | 9/2010 | Wei ...................... H04L 67/1001 726/1 |
| 2010/0322071 A1* | 12/2010 | Avdanin ............... H04L 47/32 370/230 |
| 2011/0066752 A1* | 3/2011 | Lippincott ........... H04L 43/106 709/233 |
| 2011/0066951 A1 | 3/2011 | Ward-Karet et al. |
| 2011/0197094 A1 | 8/2011 | Wagner |
| 2011/0197189 A1 | 8/2011 | Wagner et al. |
| 2011/0197205 A1 | 8/2011 | Wagner et al. |
| 2011/0208841 A1 | 8/2011 | Robertson et al. |
| 2011/0222406 A1* | 9/2011 | Persson .................. H04L 47/29 370/236 |
| 2012/0023076 A1 | 1/2012 | Torrence et al. |
| 2012/0096550 A1 | 4/2012 | Sapuntzakis |
| 2012/0144493 A1* | 6/2012 | Cole ................... H04L 63/0218 726/25 |
| 2012/0151591 A1* | 6/2012 | Cavanaugh ........... H04L 63/145 726/22 |
| 2012/0166637 A1* | 6/2012 | White, Jr. ........... H04L 63/1425 709/224 |
| 2012/0179805 A1 | 7/2012 | DiFalco |
| 2012/0195209 A1 | 8/2012 | Jain et al. |
| 2012/0195324 A1 | 8/2012 | Raghuraman et al. |
| 2012/0210434 A1 | 8/2012 | Curtis et al. |
| 2012/0215911 A1 | 8/2012 | Raleigh et al. |
| 2012/0230345 A1 | 9/2012 | Ovsiannikov |
| 2012/0311664 A1* | 12/2012 | Elrod .................. H04L 63/1416 726/1 |
| 2013/0077486 A1* | 3/2013 | Keith ...................... H04L 47/22 370/230.1 |
| 2013/0201997 A1* | 8/2013 | Masputra ........... H04L 47/6215 370/417 |
| 2013/0205002 A1* | 8/2013 | Wang ..................... H04L 69/16 709/224 |
| 2013/0322255 A1* | 12/2013 | Dillon ................. H04L 43/0888 370/236 |
| 2014/0157405 A1* | 6/2014 | Joli .................... H04L 63/1425 726/22 |
| 2014/0185628 A1* | 7/2014 | Matthews ........... H04L 47/6215 370/412 |

(56) References Cited

U.S. PATENT DOCUMENTS

| | | | |
|---|---|---|---|
| 2014/0280838 A1* | 9/2014 | Finn | H04L 49/00 709/223 |
| 2014/0297805 A1* | 10/2014 | Chaplot | H04L 47/2433 709/219 |
| 2015/0023366 A1* | 1/2015 | Lai | H04L 47/32 370/412 |
| 2015/0033351 A1* | 1/2015 | Oliphant | G06F 16/245 726/25 |
| 2015/0040232 A1 | 2/2015 | Oliphant | |
| 2015/0043384 A1* | 2/2015 | Hui | H04W 40/246 370/255 |
| 2015/0043519 A1* | 2/2015 | Hui | H04B 1/713 370/330 |
| 2015/0106939 A1 | 4/2015 | Lietz | |
| 2015/0188844 A1* | 7/2015 | Jain | H04L 47/828 370/230 |
| 2015/0295808 A1* | 10/2015 | O'Malley | H04L 47/22 709/224 |
| 2016/0080410 A1 | 3/2016 | Gorny | |
| 2017/0201545 A1* | 7/2017 | Nicodemus | H04L 63/1433 |
| 2018/0025157 A1* | 1/2018 | Titonis | H04W 12/128 726/22 |
| 2022/0076209 A1* | 3/2022 | Mody | H04L 63/1458 |

OTHER PUBLICATIONS

Hamidian, Ali, et al. "Deployment and evaluation of a wireless mesh network." 2009 Second International Conference on Advances in Mesh Networks. IEEE, 2009.*

Pareit, Daan, et al. "A novel network architecture for train-to-wayside communication with quality of service over heterogeneous wireless networks." EURASIP Journal on Wireless Communications and Networking 2012.1 (2012): 1-30.*

Brown, "Traffic Control Howto," version 1.0.2, Introduction to Linux Traffic Control, Oct. 2006, 37 pages.

ITU-T Recommendation X.667, "Information technology—Open Systems Interconnection—Procedures for the operation of OSI Registration Authorities: Generation and registration of Universally Unique Identifiers (UUIDs) and their use as ASN.1 object identifier components," Sep. 2004, 34 pages.

Linux Foundation, "generic_netlink_howto," Nov. 19, 2009, 9 pages.

Russell, "Linux 2.4 Packet Filtering Howto," Jan. 24, 2002, 19 pages.

Schnackengerg et al., "Cooperative Intrusion Traceback and Response Architecture (CITRA)," DARPA Information Survivability Conference & Exposition II, 2001, Proceedings vol. 1, IEEE, 2001, 13 pages.

* cited by examiner

BANDWIDTH THROTTLING IN VULNERABILITY SCANNING APPLICATIONS

CROSS-REFERENCE TO RELATED APPLICATIONS

This application is a divisional of U.S. patent application Ser. No. 15/709,245, filed Sep. 19, 2017 (now U.S. Pat. No. 10,623,325), which is a divisional of U.S. patent application Ser. No. 14/546,863, filed on Nov. 18, 2014 (now U.S. Pat. No. 9,781,046), which claims the benefit of U.S. Provisional Application No. 61/906,322, filed Nov. 19, 2013, entitled "BANDWIDTH THROTTLING IN VULNERABILITY SCANNING APPLICATIONS." The entire disclosure of U.S. Provisional Application No. 61/906,322 U.S. patent application Ser. No. 14/546,863, and U.S. patent application Ser. No. 15/709,245 is incorporated by reference herein for all purposes.

SUMMARY

Apparatus and methods are disclosed herein for bandwidth throttling implementations for network applications. For example, throttling of network traffic is often desirable in vulnerability scanning applications (e.g., in agentless vulnerability scanning applications using an appliance or in distributed agent-based vulnerability scanning applications). In one example of the disclosed technology, a combination of the Linux Traffic Control subsystem, Netlink, and iptables is used to throttle traffic for multiple processes across different network interfaces and application scans without the need for complex spaghetti code to keep track of how much traffic is being sent and without implementing manual throttling of packets. In other examples, including those based on non-Linux systems such as Windows, Mac OS X, Unix, or other suitable operating systems, modified or different mechanisms for throttling traffic are employed. In some examples, it is desirable to offload computational load for bandwidth throttling to the operating system kernel to provide a hands-off approach to bandwidth throttling while preserving scan accuracy, even in very low bandwidth constraint configurations.

The disclosed technology allows for throttling of network traffic at an application level (e.g., on a per-scan basis, in a vulnerability scanning application).

In one example of the disclosed technology, a computer-implemented method of routing network packets in a networked device having plural network interfaces by applying combining traffic class and network interface throttling includes marking one or more network packets with a differentiated service code, throttling the bandwidth of at least one of the network packets based at least in part on a threshold for a designated network interface for the at least one packet, thereby producing first throttled packets, throttling the bandwidth of at least one of the first throttled packets based at least in part on a threshold for the packet's respective differentiated service code, thereby producing second throttled network packets, and emitting network packets on the respective designated network interface for each of the second throttled network packets according to the throttled bandwidth.

In some examples, one or more computer-readable storage media storing computer-executable instructions that when executed by a device connected to a computer network, cause the networked device to perform the method. In some examples, the marking of the network packets is based on input received from a profiler process executing in application space on the networked device, and the throttling the network packets, the throttling the bandwidth-throttled packets, and the emitting network packets are performed by a kernel executing in privileged space on the networked device. In some examples, the method further includes sending network utilization feedback data to the profiler, the profiler being operable to adjust the rate that network packets are sent based on the network utilization feedback.

In another example of the disclosed technology, one or more computer-readable storage media storing computer-executable instructions that when executed by a device connected to a computer network, cause the networked device to perform a method including, based on input received from a device profiler application, designating one or more input network packets in a first set of packets with a code, determining a rate at which the first set of the network packets are transmitted based at least in part on a threshold associated with the code, thereby producing second throttled network packets, and transmitting the first set of network packets on the network according to the determined rate.

In another example of the disclosed technology, one or more computer-readable storage media storing computer-executable instructions for a device profiler configured to scan one or more target machines for vulnerabilities, instructions for a firewall configured to analyze packets of incoming network traffic and, emitting the incoming network traffic as marked network traffic, wherein the marked network traffic comprises one or more packets with an identifier indicating that the respective packet pertains to scan data from the device profiler, instructions for analyzing the marked network traffic, and based on the identifier, allocating bandwidth to packets of the marked network traffic, and instructions for transmitting the marked network traffic on a computer network, wherein the marked network traffic is transmitted at a rate selected based at least in part on the allocated bandwidth.

In some examples, the instructions for analyzing the marked network traffic are configured to be executed in privileged kernel space, and the instructions for the device profiler, the instructions for the firewall, the instructions for the transmitting the network traffic are configured to be executed in non-privileged user space.

This summary is provided to introduce a selection of concepts in a simplified form that are further described below in the detailed description. This summary is not intended to identify key features or essential features of the claimed subject matter, nor is it intended to be used to limit the scope of the claimed subject matter. The foregoing and other objects, features, and advantages of the invention will become more apparent from the following detailed description, which proceeds with reference to the accompanying figures.

DETAILED DESCRIPTION

I. General Considerations

Figure 1:
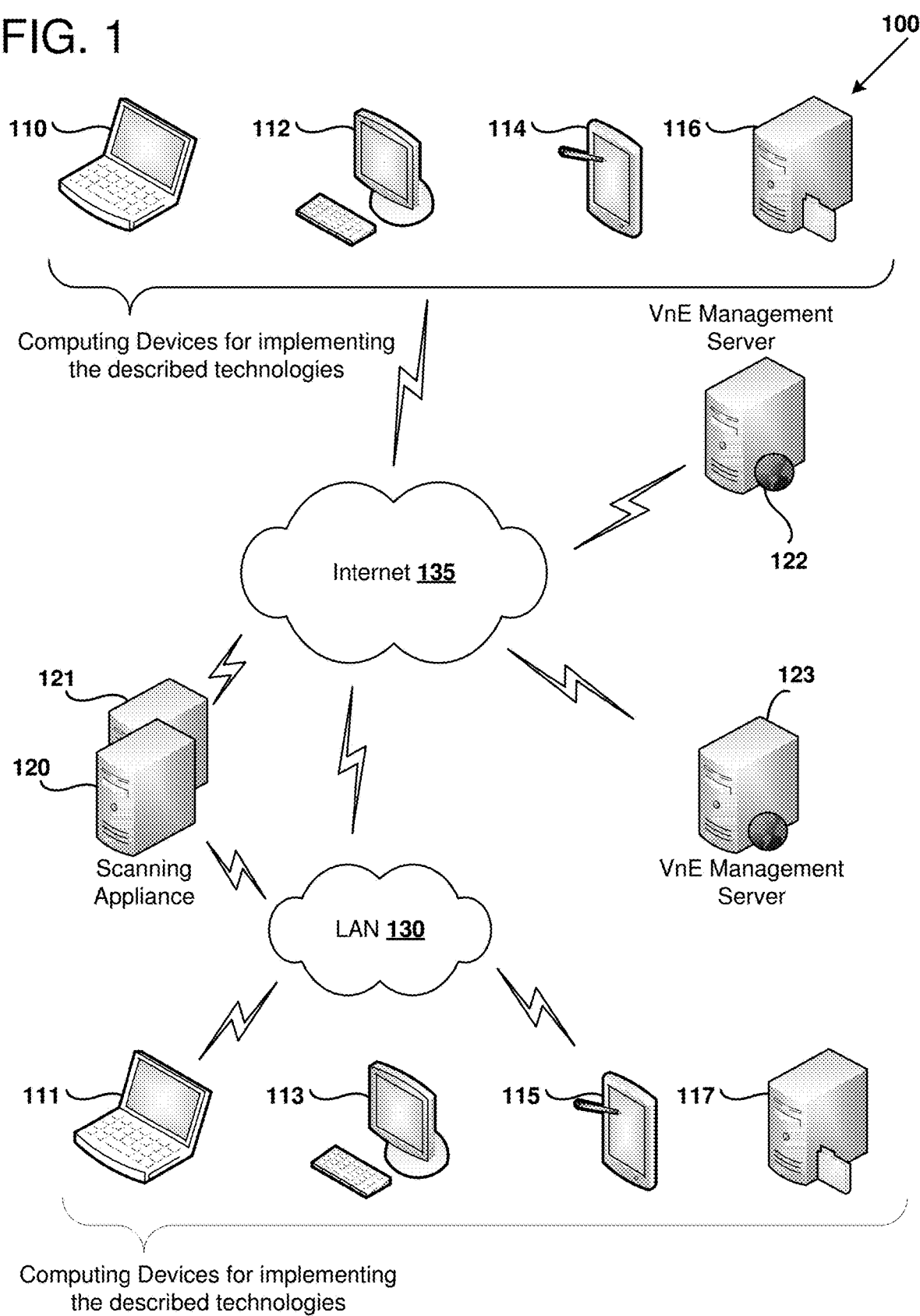
FIG. 1 is a network diagram illustrating an arrangement of devices in a computer network, as can be used in some examples of the disclosed technology.

This disclosure is set forth in the context of representative embodiments that are not intended to be limiting in any way.

As used in this application the singular forms "a," "an," and "the" include the plural forms unless the context clearly dictates otherwise. Additionally, the term "includes" means "comprises." Further, the term "coupled" encompasses mechanical, electrical, magnetic, optical, as well as other practical ways of coupling or linking items together, and does not exclude the presence of intermediate elements between the coupled items. Furthermore, as used herein, the term "and/or" means any one item or combination of items in the phrase.

The systems, methods, and apparatus described herein should not be construed as being limiting in any way. Instead, this disclosure is directed toward all novel and non-obvious features and aspects of the various disclosed embodiments, alone and in various combinations and sub-combinations with one another. The disclosed systems, methods, and apparatus are not limited to any specific aspect or feature or combinations thereof, nor do the disclosed things and methods require that any one or more specific advantages be present or problems be solved. Furthermore, any features or aspects of the disclosed embodiments can be used in various combinations and subcombinations with one another.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed things and methods can be used in conjunction with other things and methods. Additionally, the description sometimes uses terms like "produce," "generate," "display," "receive," "throttle," "mark," and "emit" to describe the disclosed methods. These terms are high-level abstractions of the actual operations that are performed. The actual operations that correspond to these terms will vary depending on the particular implementation and are readily discernible by one of ordinary skill in the art.

Theories of operation, scientific principles, or other theoretical descriptions presented herein in reference to the apparatus or methods of this disclosure have been provided for the purposes of better understanding and are not intended to be limiting in scope. The apparatus and methods in the appended claims are not limited to those apparatus and methods that function in the manner described by such theories of operation.

Any of the disclosed methods can be implemented as computer-executable instructions stored on one or more computer-readable media (e.g., non-transitory computer-readable media, such as one or more optical media discs, volatile memory components (such as DRAM or SRAM), or nonvolatile memory components (such as flash drives or hard drives)) and executed on a computer (e.g., any commercially available computer, including smart phones or other mobile devices that include computing hardware). Any of the computer-executable instructions for implementing the disclosed techniques, as well as any data created and used during implementation of the disclosed embodiments, can be stored on one or more computer-readable media (e.g., non-transitory computer-readable media). The computer-executable instructions can be part of, for example, a dedicated software application, or a software application that is accessed or downloaded via a web browser or other software application (such as a remote computing application). Such software can be executed, for example, on a single local computer (e.g., as an agent executing on any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C, C++, Java, or any other suitable programming language. Likewise, the disclosed technology is not limited to any particular computer or type of hardware. Certain details of suitable computers and hardware are well-known and need not be set forth in detail in this disclosure.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

II. Example Networking Environment for Implementing Embodiments of the Disclosed Technology An example of a possible network topology (e.g., a client-server network) for implementing a bandwidth throttling in vulnerability scanning according to the disclosed technology is depicted in FIG. 1. As shown, a network diagram 100 illustrates a number of networked computing devices (e.g., laptops 110 and 111, desktop computers 112 and 113, touch screen tablets 114 and 115, and file servers 116 and 117). The computing devices can communicate with one or more central computers (e.g., scanning appliance(s) 120 and 121, and/or Vulnerability and Exposure (VnE) management server(s) 122 and 123). Each of the scanning appliances 120 and 121 can host one or more device profiler processes that can scan any of the computing devices 110-117 over a computer network. For example, in some examples, the scanning appliances 120 and 121 are configured as external Session Message Block (SMB or Samba) clients that send traffic to one or more of the VnE management servers 122 and/or 123. In other examples, some or all of the computing devices are configured to locally host profiler processes that send data to the VnE management servers. In some examples, the scanning appliances 120 and 121 and the management servers 122 and 123 are hosted on the same virtual and/or physical computing host.

Figure 4:
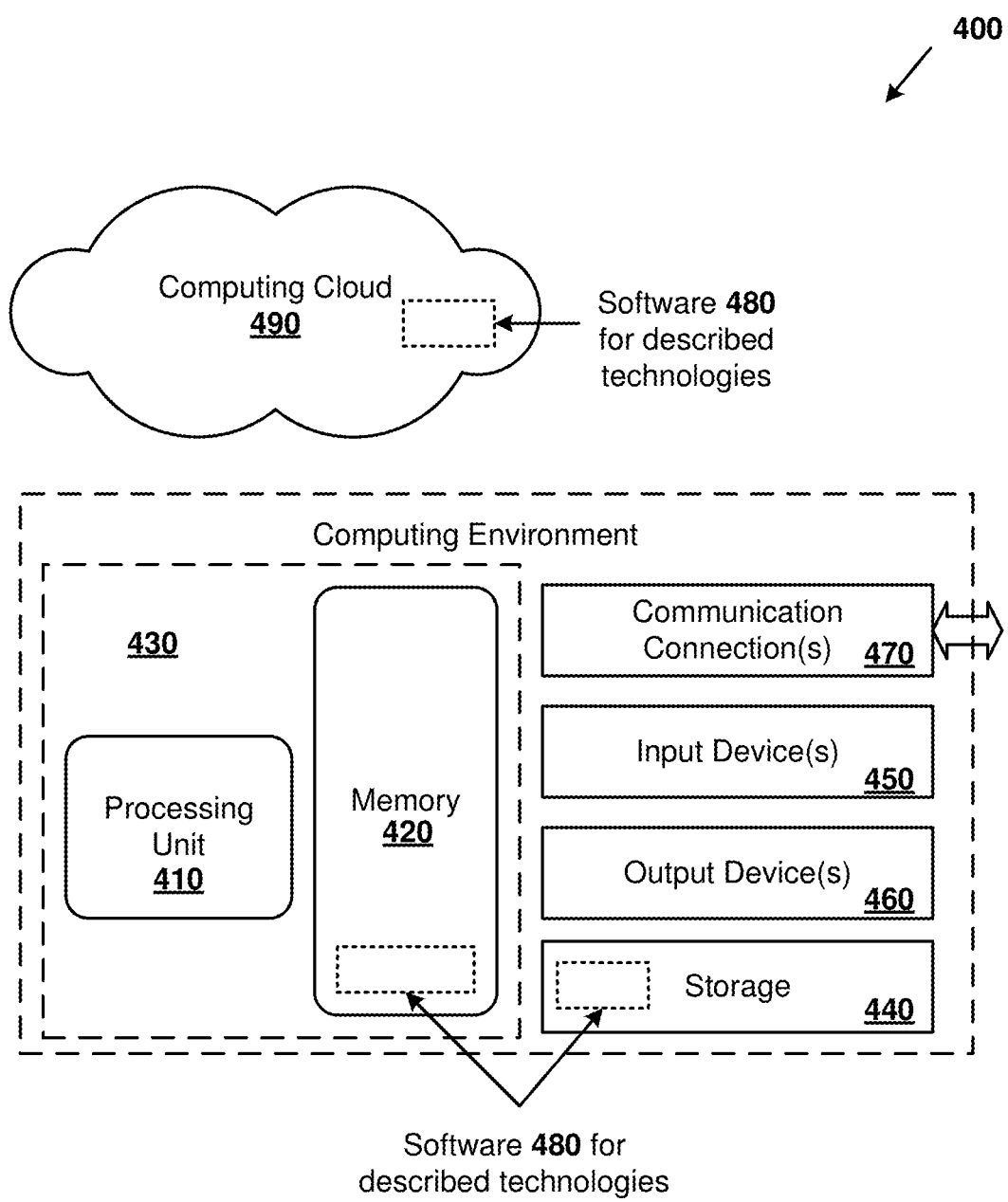
FIG. 4 illustrates a generalized example of a suitable computing environment as can be used with some examples of the disclosed technology.

The computing devices 110-117 can communicated with each other and the central computers 120-123 via a local area network (LAN) 130, the Internet network 135, a wide area network, cellular network, WiFi, and/or other suitable computing networks. The computing devices 110-117 can be, for example, computers running a browser, plug-in, or other software that communicates with one or more central computers via a computer network. The computing devices 110-117 and the central computers 120-123 can have computer architectures as shown in FIG. 4 and discussed in further detail below. The computing devices are not limited to traditional personal computers but can comprise other computing hardware configured to connect to and communicate with a network (e.g., smart phones or other mobile computing devices, servers, network devices, dedicated devices, and the like).

In the illustrated embodiment, the computing devices 110-117 are configured to communicate with one or more central computers 120-123 (e.g., using a cloud network or other client-server network). In certain implementations, the central computers 120-123 execute software for performing any of the disclosed vulnerability scanning, compliance and configuration control functionalities, for implementing any of the disclosed graphical user interfaces, and/or for computing any one or more of the intermediate or final values associated with the disclosed embodiments. The central computers 120-123 can transmit data to any of the computing devices (e.g., data to be displayed on a graphical user interface or web page at the computing devices). For example, the computing devices 110-117 can transmit a request for data to one or more central computers over a network (e.g., the LAN 130 or the Internet 135). In order to provide the data, the one or more central computers 110-117 can access data from the computing devices 120-123 (e.g., computing devices or other devices associated with assets in the IT infrastructure administered by the IT administrator), which can store various types of data used by the IT administrator. For example, the computing devices 110-117 may store device configuration data, compliance policy data, vulnerability scanning data, and/or other such data used by an IT compliance and configuration control tool. Alternatively, the one or more central computers 120-123 may themselves store the device configuration data, compliance policy, vulnerability scanning data, and other such IT data.

In some examples of the disclosed technology, the VnE management servers 122 and 123 serve as data repository and analysis engines for data received from one or more scanning appliances 120 and 121. The VnE management servers 122 and 123 can be configured in a passive mode, where connections from DP servers are received, but not initiated, by the VnE server. Data stored and analyzed by the VnE management server 122 includes alert configurations including user and system alert definitions, and vulnerability and attack data received from DP servers. In some examples, the VnE server 122 can be configured and viewed using a GUI or web browser interface. In some examples, communications to/from the VnE servers are secured using transport layer or other suitable security methods.

In some examples the central computers 120-123 (e.g., scanning appliances, VnE, and DP servers) are hosted on the same physical host, while in other examples, the central computers are hosted on different physical hosts. In some examples, virtualization technology is employed to host one or more of the central computers on the same physical host, but as different virtual machines.

The profiler processes hosted on, for examples, scanning appliances 120 and 121 include functionality for scanning a number of target devices for vulnerabilities and reporting the vulnerabilities to one or more VnE servers (e.g., servers 122 and 123). In some examples, clusters of scanning appliances each report scanning information to a different VnE server.

For example, a first scanning appliance 120 can be clustered so that it communicates scan results only to its respective VnE Management Server 122, and second scanning appliance can be clustered so that it communicates scan results only to its respective VnE Management Server 123. In some examples, scanning appliances 120 and 121 are configured for extra security by, for example, booting from a secure, read-only storage device instead of a writeable internal hard drive storage device. The profiler processes can be configured to continually profile a number of devices according to for example, network address, device characteristics, or predetermined mapping. In some examples, the profiler process is executed on a host external to the devices being scanned, while in other examples, the profiler resides on the same physical host or even the same virtual host as one or more of the computing devices 110-117 being profiled by the DP server. The scanning appliance 121 can examine target hosts for applications running on the host, open network ports, or other variables contributing to a vulnerability assessment. As the target host scans are performed, the scanning appliance 121 analyzes the data and sends reports to its corresponding VnE management server 123. In some examples, the scanning appliance 121 and its respective VnE management server 123 are hosted on the same virtual and/or physical host.

In the illustrated embodiment, the computing devices are configured to communicate with one or more central computers (e.g., the scanning appliances 120 and 121 or the Vulnerability and Exposure (VnE) management servers 122 and 123). In certain implementations, the central computers execute software for performing some or all of the disclosed vulnerability scanning functionalities. For example, the central computers 120-123 can transmit data to any of the computing devices (e.g., initiating and conducting vulnerability scans) as well as receive data from any of the computing devices (e.g., receiving data and/or results of vulnerability scan on objects associated with the computing devices).

III. Example Bandwidth Throttling in Vulnerability Scanning

Figure 2:
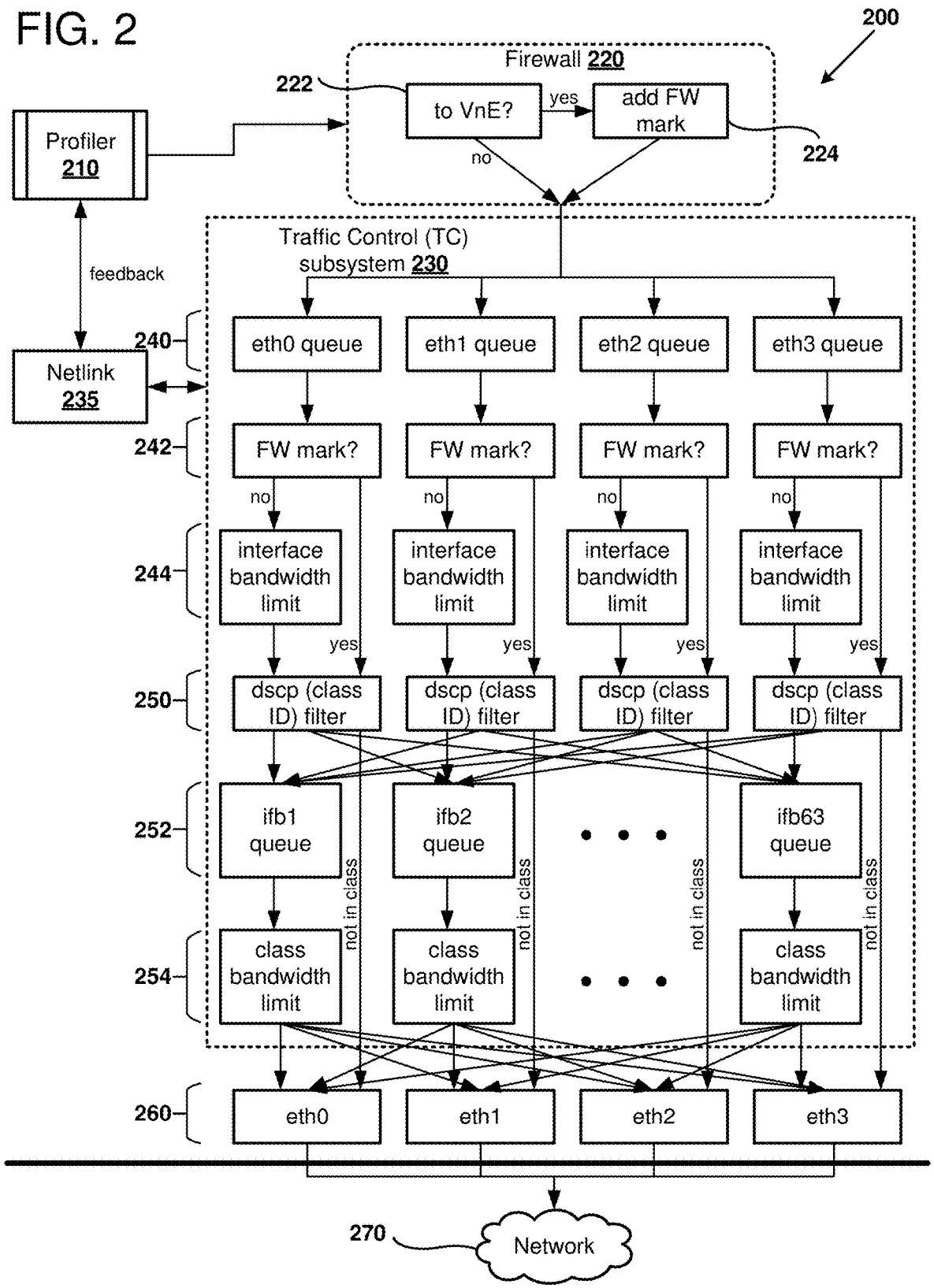
FIG. 2 is a network traffic diagram illustrating traffic flow throttling, as can be used in some examples of the disclosed technology.
Figure 3:
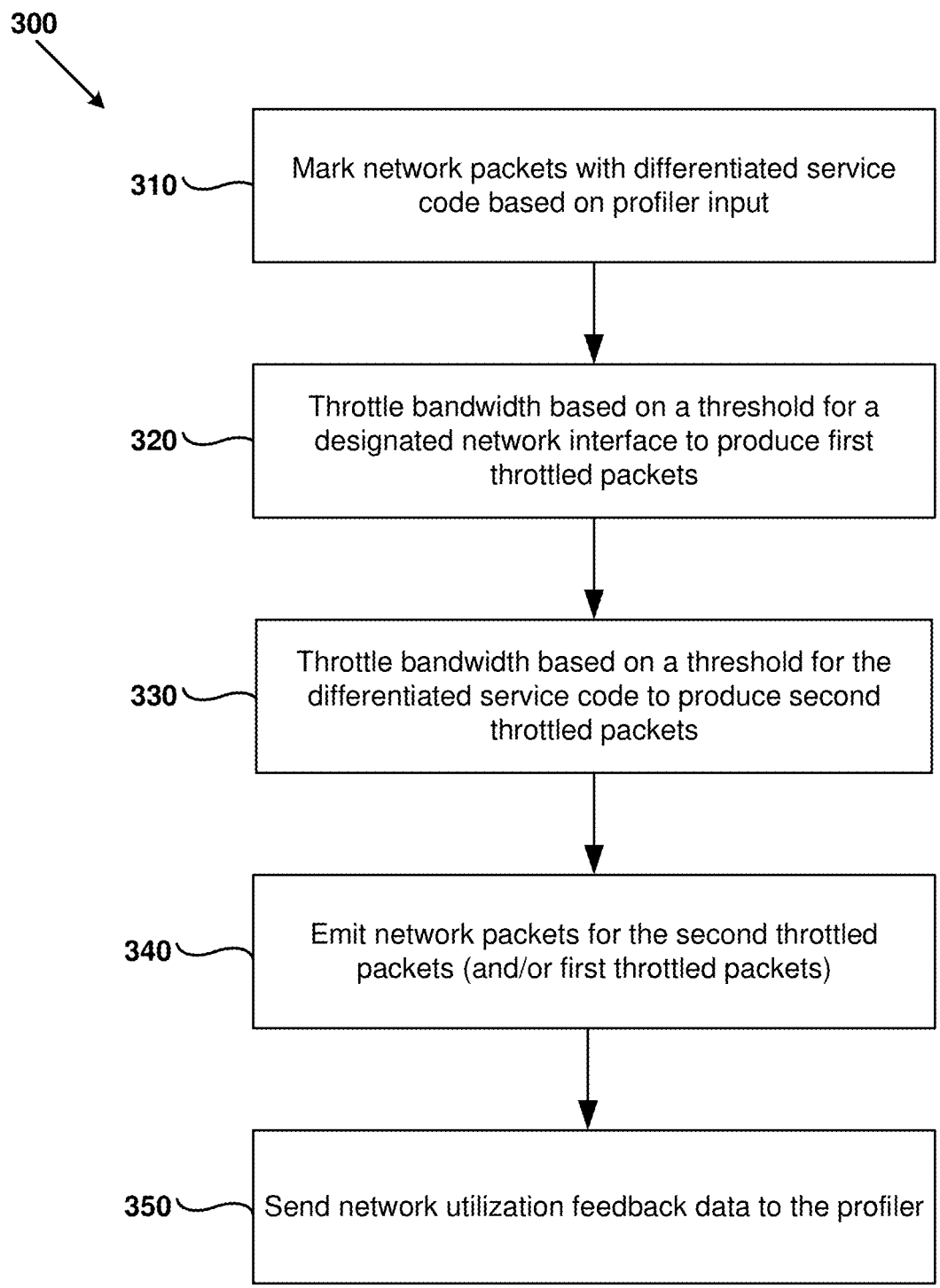
FIG. 3 is a flow chart illustrating an example technique of bandwidth throttling, as can be used in some examples of the disclosed technology.

An exemplary technique of bandwidth throttling is illustrated in a network traffic diagram 200 shown in FIG. 2 and a flow chart 300 of FIG. 3. Such bandwidth throttling can be performed in, for example, in a networked computing environment such as that illustrated in the network diagram 100 of FIG. 1.

In some examples of the disclosed technology, vulnerability scans are throttled at the scan level. This means that a scan will be restricted to configured bandwidth constraints, even across different network interfaces. The scan bandwidth constraints are configured on a scan profile received from the VnE management server 125. Bandwidth constraints on a specific interface can be configured. For example, such constraints can be configured manually from a command line interface (CLI) or graphical user interface (GUI) provided by the scanning appliance 120. Any suitable combination of bandwidth constraints can be configured. Packets for a scan can be throttled based on the scan's bandwidth constraints, and also throttled at the scan's egress interface. As used herein, "throttling" refers to regulating the rate at which network packets are emitted or transmitted on a computer network. For example, network packets can be throttled to achieve a minimum or maximum rate of data transfer expressed in bytes per second or as a portion of available network bandwidth. Such throttling rates can be expressed as an instantaneous rate, or averaged over a long period of time (seconds, minutes, or hours).

An example of network traffic flow within a scanning appliance operating in a Linux operating system environment is shown in the network traffic diagram 200 of FIG. 2. As shown, the scanning appliance is executing a profiler application 210 in user/application space that offloads bandwidth throttling by sending network packets to a firewall 220 (e.g., iptables on Linux systems) that can mark packets before sending the packets to a Traffic Control ("tc" or TC) subsystem 230, which operates in privileged kernel space. As shown, the TC subsystem 230 includes a number of network interface queues (eth0, eth1, etc.), and can perform tasks including, for example, throttling based on an interface bandwidth limit, DSCP filtering, and class bandwidth limiting. The TC subsystem 230 is also operable to send feedback data to the Profiler 210 using a Netlink socket interface 235. While the examples discussed herein generally related to traffic control in reference to an exemplary Linux system, it will be readily understood by those of ordinary skill in the relevant art that the disclosed techniques and systems can be modified for deployment on other operating systems, for example, Windows, Mac OS X, BSD, Solaris, or other suitable operating systems.

The firewall 220 includes a module 222 that analyzes incoming packets from the Profiler 210 to determine whether the packets are being sent to a location designated exempt from throttling, for example, to a VnE server. For example, TCP/IP network packets can be analyzed for one or more fields, such as service type, protocol, destination address, or other suitable fields for determining that the packet destination is a server of a type that is to be unthrottled (e.g., a packet destined for a VnE server). If the module 222 determines that the packet is destined for an unthrottled server (e.g., a VnE server), then a firewall mark is added to the packet by a module 224 before being sent to the traffic control subsystem 230. Otherwise, the packet is not marked, but still is sent to the traffic control subsystem 230. While only traffic from the profiler 210 is explicitly shown coming into the firewall 220 of FIG. 2, it will be readily understood to one of ordinary skill in the art that non-VnE network traffic data from a plurality of different processes and hosts can also be analyzed and processed by the firewall 220.

In Linux-based implementations, the task of throttling packets can be offloaded to the Linux kernel, via use of the Traffic Control Subsystem 230. For scan-wide throttling, Traffic Control (TC) rules are created that check the Differentiated Service Code Point (DSCP) values of egress packets on Ethernet interfaces for "bandwidth class" values ranging from 1-63, each value being assigned to a different scan running on the Device Profiler (e.g., a networked vulnerability scanning appliance).

As shown in FIG. 2, the TC subsystem 230 includes a number of modules that traffic can pass through before being emitted at one or more network interfaces. Traffic from the firewall 220 is first added to a network queue corresponding to the outgoing interface assigned to the packet. The example TC subsystem 230 is shown configured for four Ethernet queues 240, labeled eth0 through eth3, each of which can store a number of network packets before sending to decision modules 242, which determine whether the packet has been marked with a firewall mark. In some examples, the decision modules evaluate the DSCP field to determine whether the packet has been marked for throttling. If the packet has not been marked for interface throttling exemption, it is passed to one of the interface bandwidth limit modules 244. As shown in FIG. 2, there is an interface bandwidth limit module 244 for each available network interface. For packets passed in to each of the interface bandwidth limit modules 244, a limit is applied to control the rate at which packets are passed through the TC subsystem. The queues 240 can be used to temporarily store packets, if, for example, the rate is limited by it corresponding interface bandwidth module.

The packets from both the interface bandwidth limit modules 244 and those that are bypassed because of the decision modules 242 are then passed to a number of DSCP filters 250. Each of the DSCP filters 250 analyzes the DSCP field for packets for the associated network interface and, for those packets that have non-zero DSCP field, sends the packet to a corresponding intermediate functional block queue 252. As shown in FIG. 2, each DSCP field values is associated with a separate ifb queue: ifb1, ifb2, etc. For packets that have a DSCP field value of zero, indicating that throttling is not being applied, the packets bypass the ifb queues 252 and pass directly to one of the network interfaces 260. Thus, the system allows packets with appropriate marking to bypass class bandwidth limiting.

Packets that have a non-zero DSCP field values are routed to a queue corresponding to the packet's DSCP field and temporarily stored. The queues are typically first-in first-out (FIFO) queues, although other suitable queuing mechanisms can be used. Data is read from the queues at a rate control by the queues corresponding class bandwidth limiting modules 254. Thus, as shown in FIG. 2, there are 63 IFB queues 252 and 63 class bandwidth-limiting modules 254, one for each possible DSCP field value. In implementations where a different packet field is used for routing, or the number of field values varies, the number of queues and limits can be adjusted.

Packets are then sent from the class bandwidth limiting modules 254 back to the corresponding network interface. As shown in FIG. 2, packets from each of the 63 modules 254 are routed to one of four network interfaces 260 (eth0 through eth3). In some examples, the network interfaces reset the DSCP field values for packets back to zero before transmitting the packet on a computer network 270. In this way, the DSCP field values are used internally by the traffic control subsystem, but remain transparent to the rest of the network. In some examples, the DSCP fields can be temporarily stored as packets are routed through the TC subsystem and then reapplied before sending on the network 270.

FIG. 3 is a flow chart illustrating an example method of bandwidth throttling, as can be performed in some examples of the disclosed technology. At process block 310, network packets are marked for throttling. Via the TC rules, any matching packets can be redirected to an intermediate functional block (IFB) interface, which contains the queuing discipline (qdisc) classes responsible for throttling packets based on a particular scan's specific bandwidth constraints. Since packet throttling is offloaded to the kernel, and there can be multiple scans running at once on a DP, each network packet can be marked so that the kernel knows how to throttle them. For example, the DSCP field in the IP packet header can be used to mark each packet with a value between 0 and 63. The firewall 220, as discussed above, can be used to mark packets using DSCP fields. By convention, a value of 0 in the DSCP field indicates that throttling is disabled for that particular packet, while values between 1 and 63 are used to indicate which IFB is appropriate for directing the packet. In some examples, other packet fields or conventions are used.

At process block 320, the bandwidth of network packets marked at process block 310 is throttled based at least in part on threshold for a designated network interface for the packets to produce first throttled packets. For example, a first network interface (e.g., eth0) can be configured to have a higher threshold (e.g., 5 Mbs/second) for throttling than a second network interface (e.g., eth1 can be assigned a lower threshold of 1 Mbs/second).

At process block 330, the bandwidth of the bandwidth throttled packets from process block 320 is further throttled based at least in part on a threshold for the differentiated service code to produce second throttled network packets.

Since packet throttling is offloaded to the kernel, and there can be multiple scans running at once on a DP, each network packet can be marked so that the kernel knows how to throttle them. For example, the DSCP field in the IP packet header can be used to mark each packet with a value between 0 and 63. For example, packets marked with a DSCP value of 0 are not throttled by the kernel, and any packets marked with a value between 1 and 63 are redirected to an appropriate IFB interface for throttling. Further, some scan classes (e.g., for higher-priority vulnerabilities) can be allotted a higher threshold for bandwidth throttling than other scan classes (e.g., for lower-priority vulnerabilities).

After being throttled, packets on the IFB interfaces are automatically placed back onto the network stack for the network interfaces (e.g., an Ethernet interface) to which they originally were routed. DSCP values of 0 are reserved for scans where throttling is disabled, and as such packets with DSCP values of 0 will not be redirected to IFB interfaces. For interface IP Table-based throttling, qdisc classes are placed directly on the Ethernet interfaces themselves, and so marking the DSCP field is unnecessary. Packets can be both throttled on Ethernet interface egress and again at an IFB interface (for scan-wide throttling).

At process block 340, the throttled network packets (e.g., from process block 320 and/or 330) are emitted on the respective designated network interface for each of the second throttled network packets. To ensure that packets leaving the profiler are not handled differently by other nodes between the profiler and target, TC rules on IFB interfaces set the DSCP values of packets back to 0 (or remove the DSCP field) when the packets are emitted onto the network.

At process block 350, network utilization feedback data is sent to the profiler, to allow the profiler to adjust the rate that network packets are sent. One issue presented when using the Linux kernel for bandwidth throttling is that the profiler lacks awareness of when the kernel is holding onto packets before sending that data out, for example, in the case of a fully saturated qdisc class. This means that any timeout timers that depend on getting data back in x amount of time after sending data out if a socket are essentially reduced in time if the kernel holds on to any of this data instead of sending it out immediately.

Dynamic "backing off" can be used to resolve this issue. In the Linux operating system, a profiler can be connected to the traffic control subsystem using an inter-process communication socket interface, for example, Netlink, so that both the IFB interface and Ethernet interface for the sending host are checked in order to determine whether or not any of the qdisc classes that network packets will traverse have data in their queues. By using an IPC socket interface, data can be communicated between processes, including between user-space and kernel-space processes. Data send points within the profiler can be modified to check these qdisc queues using Netlink before attempting to send data or start any timeouts. This technique of "backing off" at the data send points allows us to keep sending data out at the configured bandwidth constraints while preventing false negatives due to premature timeouts or kernel-dropped packets. Some vulnerability assessment tests will determine a false negative based on not receiving a response from the target within a timeout period. For example, only certain web servers may respond to a request on port number 80. If the request is delayed in the TC subsystem 230 beyond the timeout period, a false negative might be recorded. Therefore, the Profiler 210 can communicate with the Netlink socket interface 235 and delay sending data to the Firewall 220 until a time when the throughput through the TC subsystem 230 is improved, and/or increase the timeout period, to avoid reporting a false negative vulnerability.

The ability to configure a combination of bandwidth constraints by using the kernel to perform the actual bandwidth throttling facilitates the adding of new data send points, as the packets need only be marked with a corresponding DSCP value for scan throttling. Packets not marked with a DSCP value will automatically be throttled at the interface bandwidth limit, if one is configured. Using Netlink to obtain TC statistics allows data send points to determine if data is ready to be sent before attempting to send, which allows avoidance of false negatives by waiting for a time where it can be assured that data will be sent, before attempting to send it, and thus waiting until that time before starting any timeout timers.

In some examples, a firewall mark is applied to some but not all of the network packets prior to throttling. The firewall mark causes the interface bandwidth throttling to not occur for the firewall marked packets. This firewall marking is used in some examples to prevent throttling of traffic between the DP and VnE. Allowing users or network administrators to specify bandwidth constraints on an interface essentially also allows a customer to throttle traffic going between the VnE and DP. Since there can be a substantial amount of data sent between these two devices, throttling that traffic can have a negative impact on total scan time. In some examples in a Linux operating system environment, this can be resolved by marking traffic destined to the VnE's IP address using IP Tables and then later ignored by TC rules. Other traffic (e.g., vulnerability scan traffic) is not so marked, and the normal TC rules are applied to those network packets. In some examples, even the traffic between the VnE and DP is throttled on an interface, as specified by an additional parameter for configuring the interface throttling.

IV. Example Computing Environment for Implementing Embodiments of the Disclosed Technology FIG. 4 illustrates a generalized example of a suitable computing environment 400 in which described embodiments, techniques, and technologies, including reporting agents and monitor servers, can be implemented. For example, the computing environment 400 can implement bandwidth-throttling implementations for a network vulnerability scanning applications, as described herein.

The computing environment 400 is not intended to suggest any limitation as to scope of use or functionality of the technology, as the technology may be implemented in diverse general-purpose or special-purpose computing environments. For example, the disclosed technology may be implemented with other computer system configurations, including hand held devices, multiprocessor systems, microprocessor-based or programmable consumer electronics, network PCs, minicomputers, mainframe computers, and the like. The disclosed technology may also be practiced in distributed computing environments where tasks are performed by remote processing devices that are linked through a communications network. In a distributed computing environment, program modules may be located in both local and remote memory storage devices.

With reference to FIG. 4, the computing environment 400 includes at least one central processing unit 410 and memory 420. In FIG. 4, this most basic configuration 430 is included within a dashed line. The central processing unit 410 executes computer-executable instructions and may be a real or a virtual processor. In a multi-processing system, multiple processing units execute computer-executable instructions to increase processing power and as such, multiple processors can be running simultaneously. The memory 420 may be volatile memory (e.g., registers, cache, RAM), non-volatile memory (e.g., ROM, EEPROM, flash memory, etc.), or some combination of the two. The memory 420 stores software 480, images, and video that can, for example, implement the technologies described herein. A computing environment may have additional features. For example, the computing environment 400 includes storage 440, one or more input devices 450, one or more output devices 460, and one or more communication connections 470. An interconnection mechanism (not shown) such as a bus, a controller, or a network, interconnects the components of the computing environment 400. Typically, operating system software (not shown) provides an operating environment for other software executing in the computing environment 400, and coordinates activities of the components of the computing environment 400.

The storage 440 may be removable or non-removable, and includes magnetic disks, magnetic tapes or cassettes, CD-ROMs, CD-RWs, DVDs, or any other medium which can be used to store information and that can be accessed within the computing environment 400. The storage 440 stores instructions for the software 480 and vulnerability scanning rules and data, which can implement technologies described herein.

The input device(s) 450 may be a touch input device, such as a keyboard, keypad, mouse, touch screen display, pen, or trackball, a voice input device, a scanning device, or another device, that provides input to the computing environment 400. For audio, the input device(s) 450 may be a sound card or similar device that accepts audio input in analog or digital form, or a CD-ROM reader that provides audio samples to the computing environment 400. The output device(s) 460 may be a display, printer, speaker, CD-writer, or another device that provides output from the computing environment 400.

The communication connection(s) 470 enable communication over a communication medium (e.g., a connecting network) to another computing entity. The communication medium conveys information such as computer-executable instructions, compressed graphics information, video, or other data in a modulated data signal.

Some embodiments of the disclosed methods can be performed using computer-executable instructions implementing all or a portion of the disclosed technology in a computing cloud 490. For example, vulnerability scanning can be executed in the computing environment 430 (e.g., by a scanning appliance 120), while collection of vulnerability data can be performed on remote servers located in the computing cloud 490 (e.g., by a VnE management server 122).

Computer-readable media are any available media that can be accessed within a computing environment 400. By way of example, and not limitation, with the computing environment 400, computer-readable media include memory 420 and/or storage 440. As should be readily understood, the term computer-readable storage media includes the media for data storage such as memory 420 and storage 440, and not transmission media such as modulated data signals.

In view of the many possible embodiments to which the principles of the disclosed invention may be applied, it should be recognized that the illustrated embodiments are only preferred examples of the invention and should not be taken as limiting the scope of the invention.

We claim:

1. One or more computer-readable storage media storing computer-executable instructions that when executed by a networked device having a traffic control subsystem, the network device being connected to a computer network, cause the networked device to perform a method, the instructions comprising:

instructions that cause the networked device to, based on input received from a device profiler application, designate one or more input network packets in a first set of network packets with a code used internally by the traffic control subsystem;

instructions that cause the networked device to determine a rate at which the first set of the network packets are transmitted based at least in part on a threshold associated with the code, thereby producing throttled network packets; and instructions that cause the traffic control subsystem of the networked device to transmit the first set of network packets on the network according to the determined rate and to reset the code to a value that is transparent to the network before transmission of the first set of network packets on the network.

2. The computer-readable storage media of claim 1, wherein the code is a differentiated service code, and wherein the network is a wired, wireless, or optical network.

3. The computer-readable storage media of claim 1, wherein the rate is a first rate, and wherein the instructions further comprise:

instructions that cause the networked device to determine a second rate at which a second set of network packets are transmitted based at least in part on a threshold for a network interface designated for transmission of the second set of network packets; and instructions that cause the networked device to transmit the second set of network packets via the network interface according to the designated second rate.

4. The computer-readable storage media of claim 1, wherein the input from the device profiler application indicates real-time traffic characteristics of the network.

5. The computer-readable storage media of claim 1, wherein the instructions further comprise:

instructions that cause the networked device to, during the determining, store a second code for a first network packet of the first set; and instructions that cause the networked device to, prior to transmitting the second set of network packets, replace the first code with the stored second code for the first network packet.

6. The computer-readable storage media of claim 1, wherein the instructions further comprise:

instructions that cause the networked device to, prior to transmitting the second set of network packets, remove the first code from at least one of the network packets of the first set.

7. A system comprising:
one or more processors;
two or more physical network interfaces; and memory or storage devices storing computer-executable instructions that when executed by the one or more processors, cause the system to:
   based on input received from a device profiler application, designate one or more input network packets in a first set of network packets with a first code;
   determine a first rate at which the first set of the network packets are transmitted based at least in part on a threshold associated with the first code, thereby producing throttled network packets;
   transmit the first set of network packets on a network according to the determined first rate,
   wherein the first code for the first set of network packets is removed when the first set of network packets is transmitted to retain transparency of the first set of network packets on the network.

8. The system of claim 7, wherein the first code is a differentiated service code, and wherein the network is a wired, wireless, or optical network.

9. The system of claim 7, wherein the memory or storage devices store further computer-executable instructions that, when executed by the one or more processors, cause the system to:
   determine a second rate at which a second set of network packets are transmitted based at least in part on a threshold for one of the physical network interfaces that is designated for transmission of the second set of network packets; and
   transmit the second set of network packets via said one of the physical network interfaces according to the designated second rate.

10. The system of claim 7, wherein the memory or storage devices store further computer-executable instructions that, when executed by the one or more processors, cause the system to configure:
   a firewall that receives the input from the device profiler application; and
   a traffic control subsystem that receives the input network packets from the firewall and transmits the first set on the network.

11. A method comprising:
   determining a first rate at which a first set of one or more input network packets are transmitted based at least in part on a threshold associated with a first code of the one or more input network packets, thereby producing throttled network packets; and
   transmitting the first set on a network according to the determined rate,
   wherein the first code is one of multiple available values, the multiple available values including a value indicating that the network packets are not to be throttled.

12. The method of claim 11, further comprising, prior to the determining:
   receiving, at a first device, input from a device profiler application; and
   based on the received input, designating the one or more input network packets of the first set with the first code.

13. The method of claim 12, further comprising adjusting a rate at which network packets are sent to the first device based on network utilization feedback data.

14. The method of claim 12, wherein the first device comprises:
   a firewall that receives the input from the device profiler application; and
   a traffic control subsystem that receives the input network packets from the firewall and transmits the first set on the network,
   the traffic control subsystem being configured to disable any throttling when the first code indicates that the network packets are not to be throttled.

15. The method of claim 11, further comprising:
   during the determining, storing a second code for a first network packet of the first set; and
   prior to the transmitting, replacing the first code with the stored second code for the first network packet.

16. The method of claim 11, further comprising, prior to the transmitting, removing the first code from at least one of the network packets of the first set.

17. The method of claim 11, further comprising:
   determining a second unthrottled rate at which a second set of network packets are transmitted when the second code for the second set of network packets has the value indicating that the network packets are not to be throttled; and
   transmitting the second set of network packets via the network interface according to the second unthrottled rate.

18. The method of claim 11, wherein the first code is a differentiated service code, and wherein the network is a wired, wireless, or optical network.

* * * * *